Figure 1:
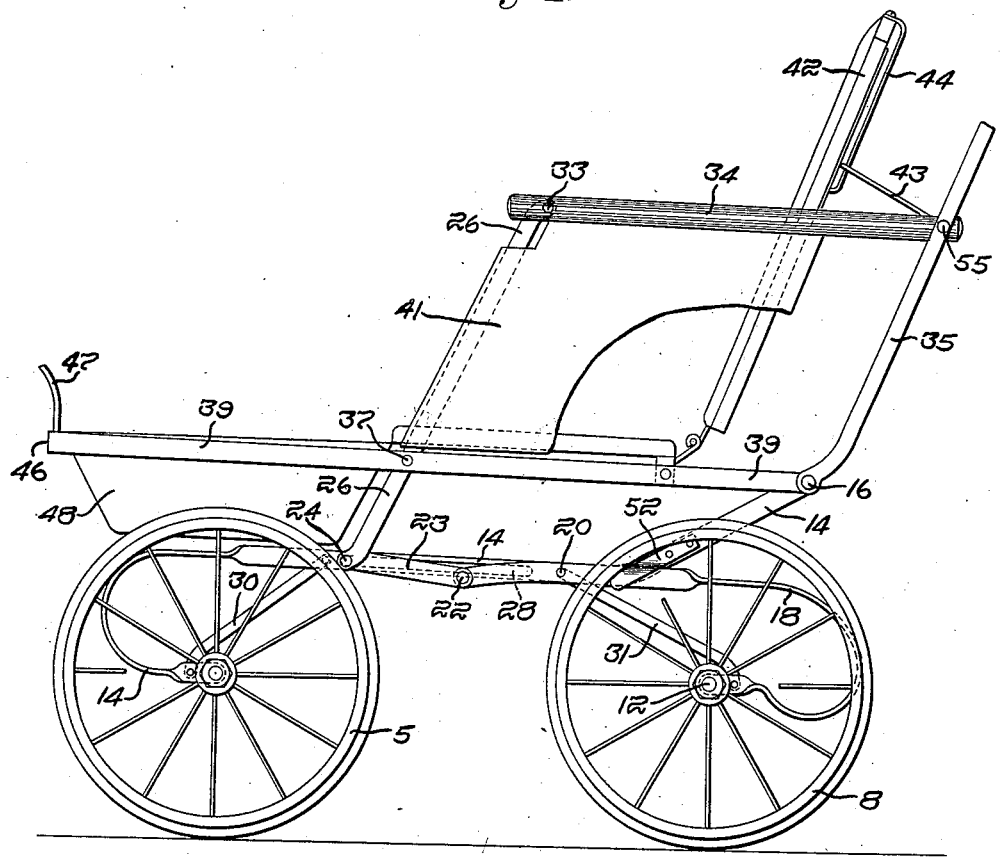

G. B. AMBLER.
FOLDING VEHICLE.
APPLICATION FILED JULY 14, 1911.

1,095,975.

Patented May 5, 1914.
2 SHEETS—SHEET 1.

G. B. AMBLER.
FOLDING VEHICLE.
APPLICATION FILED JULY 14, 1911.
1,095,975.
Patented May 5, 1914.
2 SHEETS—SHEET 2.
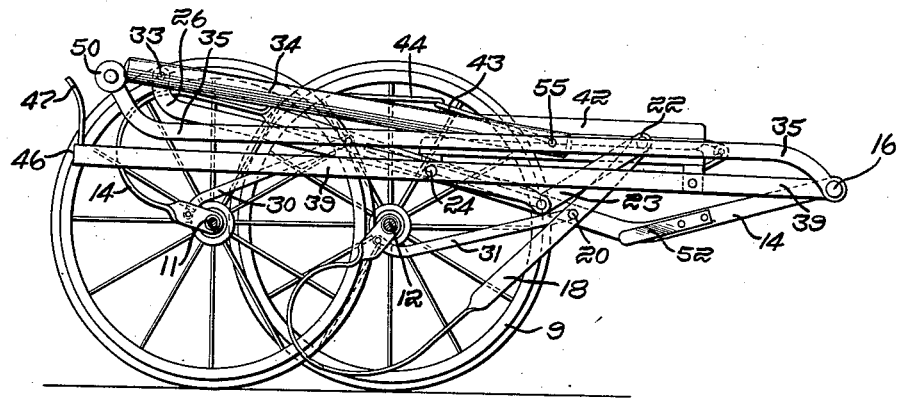
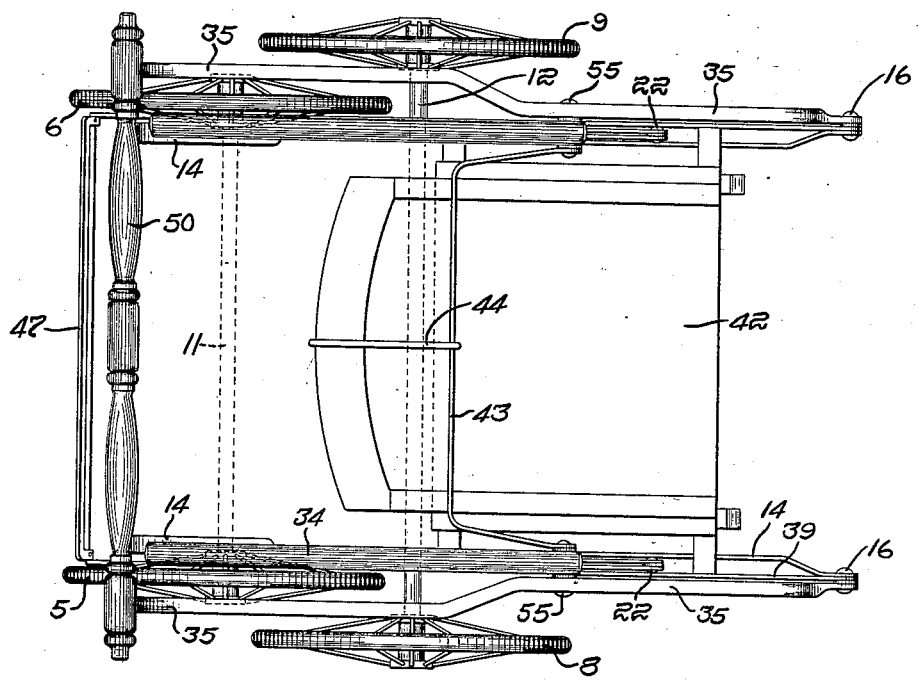
Witnesses:
Carl L. Choate.
Horace A. Croseman.
Inventor:
George B. Ambler,
by Emery, Booth, Janney & Varney,
Attys.

UNITED STATES PATENT OFFICE.

GEORGE B. AMBLER, OF LEOMINSTER, MASSACHUSETTS, ASSIGNOR TO F. A. WHITNEY CARRIAGE CO., OF LEOMINSTER, MASSACHUSETTS, A CORPORATION OF MASSACHUSETTS.

FOLDING VEHICLE.

1,095,975. Specification of Letters Patent. Patented May 5, 1914.

Application filed July 14, 1911. Serial No. 638,565.

*To all whom it may concern:*

Be it known that I, GEORGE B. AMBLER, a citizen of the United States, and a resident of Leominster, county of Worcester, and State of Massachusetts, (whose post-office address is Leominster, Massachusetts,) have invented an Improvement in Folding Vehicles, of which the following description, in connection with the accompanying drawings, is a specification, like characters on the drawings representing like parts.

This invention relates to folding or collapsing children's vehicles or the like; and presents what is substantially a new type of such vehicle having some of the advantageous features of construction of the old type in which wheel carriers fold transversely under the vehicle and combining therewith advantageous features of construction of another old type in which the wheels are moved longitudinally of the vehicle into a more compact relation with the superstructure than when the vehicle is erected. The combination of the respective advantages of these prior types, together with the novel constructions by which the advantages of both types are rendered available in a single construction, produce an entirely new type of vehicle having characteristics which are now presented for the first time in the art.

Among other objects, the invention is intended to produce a vehicle of very light construction having few and simple parts in a very simple organization, which at the same time shall be strong and durable and shall support the occupant comfortably and upon adequately yielding springs.

The character of the invention may be readily understood by reference to one practicable embodiment shown by way of illustration in the accompanying drawings, in which:

Figure 1 is a side elevation of the illustrative embodiment in erected position; Fig. 2 is a side elevation of the same embodiment in folded or collapsed position; and Fig. 3 is a plan view thereof in the collapsed position shown in Fig. 2.

The illustrative vehicle comprises front wheels 5, 6 and rear wheels 8 and 9. Preferably, for the sake of rigidity and strength, the front wheels 5, 6 are mounted upon a common integral axle 11; and likewise the rear wheels are preferably mounted upon a common integral axle 12.

The axle 11 is appropriately mounted in the lower ends of a frame piece 14 (duplicated at opposite sides of the vehicle) which are preferably bent to supply supporting springs. As shown in Fig. 1, the frame piece 14 consists of a preferably metal bar or strip extending from the front axle 11 along the spring bend and thence rearwardly toward the rear end of the vehicle to a pivot 16 upon which the frame piece 14 is adapted to oscillate in relation to other parts as presently described.

The rear axle 12 is mounted in frame pieces 18 preferably bent to afford spring supports. Each frame piece 18 is pivoted at 20 to the adjacent frame piece 14 carrying the front axle; and beyond said pivot 20 (toward the left in Fig. 1) each frame piece 18 has an extension carrying a pin 22 connected by a link 23 to a pin 24 upon the lower end of a lever 26. The pin 24 projects into a guide slot 28 formed in the frame piece 14.

Each frame piece 14 may be reinforced by a strut 30 suitably connecting separated parts of the frame piece, and, in like manner, the frame piece 18 may be reinforced by a similar strut 31. Struts 30 and 31 perform, in the specific organization shown, substantially the functions of a reach, maintaining, or contributing to maintain, the wheels in proper relationship. It will be noted that the lower end of each strut is offset somewhat from the axis upon which the adjacent wheel revolves; and with this arrangement the thrust transmitted through the strut is applied at a point somewhat removed from the wheel axis and is applied to a part which can yield or swing upon the wheel axis. By such an organization or its equivalent, the spring of each frame piece 14 or 18 is adequately reinforced but is permitted to yield in the performance of its spring function and the lower end of each strut likewise yields to the same end.

The specific illustrative lever 26 performs several functions presently referred to; and it preferably extends upwardly to a pivotal connection 33 with the side frame 34 which serves in the specific construction as a link connecting the lever 26 with a handle bar 35 mounted at its lower end upon the pivot 16 already referred to. The lever 26 has another pivot 37 providing a fulcrum for said lever during part of the operation thereof, said pivot 37 connecting the lever 26 with a bar 39 which, in the illustrative construction, extends from the front of the vehicle to the pivot 16. Thus, the handle bar 35, the side bar 39, and the frame piece 14 for the front axle, are all three pivotally connected by the pivot 16.

Supported in any suitable manner upon opposite side bars 39, 39 is a seat 41 having a back 42 which may be supported at the rear of the seat, preferably upon some sort of a hinge joint so that the back may be adjusted from a substantially upright position toward a reclining position. The back 42 may be held in adjusted position by means of a yoke 43 engaged by a guide strap 44, the yoke 43 having its ends pivoted to the handle bars 35 all as well understood in the art. The side bars 39 may be connected at their ends by a cross piece 46 provided with a dash board 47; and between the cross piece 46 and the seat 41 may be suspended or otherwise supported a foot well 48.

The handle bars 35 at opposite sides of the vehicle are preferably connected by a suitable handle 50 as shown in Figs. 2 and 3.

Fig. 1 shows the illustrative vehicle in erected position wherein the frame piece 18 for the rear axle is engaged by a clip 52 fixed upon the frame piece 14 for the front axle, said clip serving as a stop to prevent movement of the frame piece 18 contraclockwise relative to the pivot 20. Said clip 52 also preferably embraces the frame piece 18 against movement transversely of the vehicle and thereby contributes to prevent improper transverse movement of the wheels on their illustrative common axle, and tends otherwise to strengthen and increase the rigidity of the vehicle. When the parts are in the position shown in Fig. 1 with the described stop engagement between the frame piece 18 and clip 52, the pivot 22 rests below the line of centers of the pivots 20 and 24. Thus, the pivot 20 constitutes in effect the knuckle of a toggle joint of which the arms are the link 23, and that part of the frame piece 18 lying between the pivot 20 and 22. It will be noted, therefore, that said toggle has been broken past dead-center in order to position the frame piece 18 in its stop engagement with the clip 52; and such toggle action serves to lock the parts in such positions.

One of the first stages in the operation of collapsing the illustrative vehicle comprises a movement of the frame piece 18 in a clockwise direction about the pivot 20; and to initiate such movement the pivot 22 must be forced upwardly through dead-center position to break on the opposite side of dead-center. In the practical use of the specific construction illustrated in the drawings, this may be readily done by the attendant by merely grasping the handle at the top of the bars 35 and pulling the same upward while bracing downwardly with the foot upon the axle 12. When the exemplary locking toggle has been broken, the vehicle is then in condition to be folded and this may be done by merely swinging the handle bars 35 contraclockwise upon their pivots 16. This contraclockwise movement of the handle bars, through the side bars 34, rocks the levers 26 contraclockwise about their pivots 37. The pivot 22 being then positioned above the line of centers between the pivots 20 and 24, the contraclockwise movement of the lever 26 throws the link 23 toward the right in Fig. 1 and thereby rocks the frame piece 18 clockwise about the pivot 20. When the handle bars 35 have been moved to the limit of their contraclockwise travel about the pivot 16, the various parts will occupy the position shown in Fig. 2.

That part of the lever 26 lying between the pivot 37 and the pivot 24, serves as a strut between the side bar 39 and the frame piece 14 for the front wheels, the pin 24 projecting into a slot 28 in the frame piece 14 as already described. In this manner the side bar 39 and the seat and other parts carried thereby, are supported on the frame piece 14 through the lower end of the lever 26. With this arrangement, as the lever 26 is rotated contraclockwise from the position of Fig. 1 to the position of Fig. 2, the side bar 39 is lowered in a contraclockwise direction about the pivot 16; or to express it differently, the side bars 39 and the frame pieces 14 are folded together about their common pivot 16. Thus, in effect, the seat supporting frame collapses into a position between the front wheels 5 and 6 and rear wheels 8 and 9 and takes a position proximate the axes of the wheels. Toward the end of this collapsing movement, the side bars 34 may contact at their left ends in Fig. 2 with the upper portions of the spring bends in the frame pieces 14; and such contact may arrest further movement of the pivots 33 thereby rendering said pivot 33 temporarily a fixed end pivot of a toggle consisting of the side bar 34 and handle bars 35 having the knuckle at their common pivot 55 and their other end pivot at the pin 16. In the final contraclockwise movement of the handle bars, during collapse, the two end pivots 16 and 33 of the toggle remain substantially stationary as the knuckle 55 approaches the dead center, and as the handle bars take their final collapsed position the knuckle 55 is moved past dead-center to break the toggle into an effective locking position which holds the vehicle as a whole collapsed until the knuckle 55 is forcibly moved back to break the toggle again to the opposite side of dead center.

When it is desired to erect the vehicle from the position shown in Fig. 2, the handle 50 is lifted and the handle bars 35 moved clockwise about the pivot 16 reversing the operations above described and again breaking the toggle 20, 22, 24 past the dead center as shown in Fig. 1, to hold the vehicle erected.

Referring now to Fig. 2, it will be noted that the rear wheels are moved so close to the front wheels that the two overlap; and to provide for this overlapping relation it is preferred that the two wheels at each side of the vehicle shall be out of lengthwise alinement; that is to say the wheels at each side of the vehicle shall be in different planes. This may be accomplished conveniently, for example, by having the rear wheels spaced apart axially a greater distance than that between the front wheels, as shown in Fig. 3. To suit this purpose, the rear wheels 8 and 9 are mounted upon an axle 12 which is longer than the front axle 11 so that when the rear wheels are folded up toward the front wheels, the former take a position overlapping the outer sides of the latter.

The space between the planes of the front and rear wheels on each side of the vehicle is desirably availed of in the specific construction of the drawings to receive part of the handle bars when the latter are collapsed, and for this purpose the handle bars are bent in the angular forms shown in Fig. 3.

Referring to the back 42 shown in Fig. 1, the latter is preferably connected to the common pivot 55 of the side bars 34 and handle bars 35, said pivot 55 constituting the knuckle of the toggle which is broken past dead center to lock the parts in collapsed position. Thus, when in the position of Fig. 2, this toggle action likewise locks the back 42 in collapsed position substantially against the seat.

Among other objects of the above described construction, all of which will be apparent to those skilled in the art, it will be noted that when collapsed the maximum thickness (from top to bottom in Fig. 2) of the vehicle, is the diameter of the wheels. The vehicle is very rigid and stable when in erected position while at the same time all of the parts supporting the occupant are supported upon fully adequate springs. The main frame of the vehicle (i. e. that comprising the illustrative side bars 39 and supporting the seat, the adjustable back, the foot well, and handle bars) is substantially a unit in construction and, as illustrated, the collapsing of the entire superstructure in a construction embodying this invention, may be entirely independent from the collapsing of the running gear except that it is preferred that the two be connected (as, for instance, through the lever 26 as shown in Fig. 1) so that the collapsing operation shall take place in unison. The seat supporting frame may be rigid or substantially rigid, as in the case of the frame comprised by the opposite side bars 39, such frame being merely mounted upon the collapsible running gear parts while not constituting any essential part of the collapsing mechanism for the running gear. The preferred substantial segregation of the collapsible superstructure and the collapsible running gear is advantageous because it simplifies the construction and for various other reasons which will appear to those skilled in the art.

It is to be understood that the specific construction shown in the drawings and described above has been disclosed merely for illustration and is susceptible of considerable modification in construction, organization and mode of operation within the scope of the sub-joined claims. It is not indispensable that all the features of the invention be used conjointly since they may be used to advantage separately.

Claims:

1. A vehicle of the character described comprising, in combination, a main frame; front wheels; a carrier for the front wheels pivoted proximate the rear end of the frame and extending when erected parallel to the frame and forwardly to a point near the front end of the frame, the axis of said pivot extending transversely of the frame, whereby the front wheels are foldable toward and from the frame; movable means interposed between said wheel carrier for the front wheels, and the frame, to hold them in erected position; and rear wheels foldable toward the frame.

2. A vehicle of the character described comprising, in combination, a main frame; a wheel carrier pivoted near one end of the frame on an axis extending transversely of the frame, said wheel carrier extending toward a point proximate the other end of the frame and in a direction substantially parallel to the frame; a pair of wheels carried by said wheel carrier near the opposite end of the frame from said wheel carrier pivot; and a second wheel carrier pivoted to the first named wheel carrier on an axis extending transversely in relation to the frame.

3. A vehicle of the character described comprising, in combination, a main frame; a front wheel carrier pivoted near the rear end of the frame and extending beneath the frame to a point proximate the opposite end thereof; front wheels carried by the front end of said wheel carrier; a rear wheel-carrier pivoted to the front-wheel carrier; a rear wheel on said rear wheel carrier, having its axis located in a vertical plane in front of the pivot between the frame and the front-wheel carrier; and means for folding said wheel-carriers on their pivots into close relation with said frame.

4. A vehicle of the character described, comprising, in combination, a frame; and a running gear connected thereto and comprising bowed spring members interposed between the wheel axles and frame; and a strut arranged for reinforcing a spring member and extending from said member toward the wheel axle.

5. A vehicle of the character described comprising, in combination, a substantially horizontal main body frame; a seat and body supported on said frame; handles pivoted on said frame; a slotted wheel carrier pivotally connected to said main frame; a second wheel carrier fulcrumed on said slotted wheel carrier; a member pivotally connected to said main frame and to said slot; and a link pivotally connected to said second wheel carrier and member and having a pivot adapted to slide in said slot in collapsing the vehicle.

6. A vehicle of the character described comprising, in combination, a main frame; a seat and back supported thereon; handles pivoted on said frame; a wheel carrier pivotally connected to said main frame and having a portion extending forwardly substantially parallel to said frame; a wheel carrier pivotally connected to said first named carrier; a stop on the latter for co-operation with said second named carrier; and toggle means for locking the latter against said stop to hold the vehicle in erected position.

7. A vehicle of the character described comprising in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; a carrier for the rear wheels pivoted to the carrier for the front wheels and foldable toward the front wheels; and movable means interposed between the wheel carriers and the frame to hold the latter in its erected position.

8. A vehicle of the character described comprising in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; a carrier for the rear wheels pivoted to the carrier for the front wheels and foldable toward the front wheels; and movable means interposed between the wheel carriers and the frame and having provision for locking the carriers in erected position.

9. A vehicle of the character described comprising in combination, a frame; a front wheel carrier and handles pivoted to said frame; a rear wheel carrier pivoted to said front wheel carrier and including a toggle member; a lever pivoted to said frame; means connecting said lever to said handles; and a toggle link pivotally connected to said lever and to said toggle member for locking the carriers in erected position.

10. A vehicle of the character described comprising in combination, a frame; a front wheel carrier and handles pivoted to said frame proximate one end of the latter; a rear wheel carrier pivoted to said front wheel carrier and including a toggle member; a lever pivoted intermediate its ends to said frame; a toggle link connecting one end of said lever with said toggle member; and a member connecting said lever with said handles, said lever, toggle parts and connecting member having provision for locking the handles, frame and wheel carriers in erected position.

11. A vehicle of the character described comprising in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; and a carrier for the rear wheels pivoted to the carrier for the front wheels and foldable toward the front wheels; said frame and carriers having provision for automatically locking the same in erected position on adjustment thereof to said position.

12. A vehicle of the character described comprising in combination, a main frame; a seat and back supported thereon; handles pivotally connected to said frame; a wheel carrier pivotally connected to said main frame proximate the rear end thereof and extending forwardly toward the front end of said frame; a wheel carrier pivoted to said first named carrier; and a stop on the latter; said carriers having provision for automatically locking said second named carrier against said stop on adjustment of said carriers to erected position.

13. A vehicle of the character described comprising in combination, a substantially horizontal main body frame; a seat and body supported on said frame; handles pivoted on said frame; a wheel carrier pivotally connected to said main frame; a second wheel carrier fulcrumed on said first named carrier; a member pivotally connected to said main frame; means providing a sliding connection of said member with said first named carrier; and a link pivotally connected to said member and second named carrier.

In testimony whereof, I have signed my name to this specification, in the presence of two subscribing witnesses.

GEORGE B. AMBLER.

Witnesses:
ROBERT H. KAMMLER,
F. IRENE CHANDLER.

Copies of this patent may be obtained for five cents each, by addressing the "Commissioner of Patents, Washington, D. C."